United States Patent
Otenko

(10) Patent No.: US 9,110,715 B2
(45) Date of Patent: Aug. 18, 2015

(54) SYSTEM AND METHOD FOR USING A SEQUENCER IN A CONCURRENT PRIORITY QUEUE

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 215 days.

(21) Appl. No.: 13/781,493

(22) Filed: Feb. 28, 2013

(65) Prior Publication Data

US 2014/0245313 A1  Aug. 28, 2014

(51) Int. Cl.
G06F 9/46 (2006.01)
G06F 15/173 (2006.01)
G06F 9/48 (2006.01)
G06F 9/50 (2006.01)
G06F 9/52 (2006.01)
G06F 9/54 (2006.01)

(52) U.S. Cl.
CPC ............... *G06F 9/4881* (2013.01); *G06F 9/46* (2013.01); *G06F 9/48* (2013.01); *G06F 9/4887* (2013.01); *G06F 9/50* (2013.01); *G06F 9/5005* (2013.01); *G06F 9/5027* (2013.01); *G06F 9/5038* (2013.01); *G06F 9/52* (2013.01); *G06F 9/524* (2013.01); *G06F 9/526* (2013.01); *G06F 9/546* (2013.01)

(58) Field of Classification Search
None
See application file for complete search history.

(56) References Cited

U.S. PATENT DOCUMENTS

| | | |
|---|---|---|
| 5,109,384 A | 4/1992 | Tseung |
| 6,449,614 B1 | 9/2002 | Marcotte |
| 6,874,144 B1 | 3/2005 | Kush |
| 6,895,590 B2 | 5/2005 | Yadav |
| 6,938,085 B1 | 8/2005 | Belkin et al. |
| 7,046,676 B2 | 5/2006 | Goetzinger et al. |
| 7,554,993 B2 | 6/2009 | Modi et al. |
| 7,685,391 B1 | 3/2010 | Cholleti et al. |
| 7,761,617 B2 | 7/2010 | Seigneret et al. |
| 7,991,904 B2 | 8/2011 | Melnyk et al. |
| 8,130,776 B1 | 3/2012 | Sundararajan |
| 8,131,860 B1 | 3/2012 | Wong et al. |
| 8,255,914 B1 | 8/2012 | Joyce et al. |
| 8,347,302 B1 * | 1/2013 | Vincent et al. ............... 718/104 |
| 8,504,691 B1 | 8/2013 | Tobler et al. |

(Continued)

FOREIGN PATENT DOCUMENTS

WO  2012084835  6/2012

OTHER PUBLICATIONS

European Patent Office, International Searching Authority, International Search Report and Written Opinion dated Mar. 14, 2014 for International Application No. PCT/US2013/067108, 12 pages.

(Continued)

*Primary Examiner* — Charles Swift
(74) *Attorney, Agent, or Firm* — Tucker Ellis LLP

(57) ABSTRACT

A system and method can support a concurrent priority queue. The concurrent priority queue allows a plurality of threads to interact with the priority queue. The priority queue can use a sequencer to detect and order a plurality of threads that contend for one or more requests in the priority queue. Furthermore, the priority queue operates to reduce the contention among the plurality of threads.

20 Claims, 11 Drawing Sheets

(56) References Cited

U.S. PATENT DOCUMENTS

| | | | |
|---|---|---|---|
| 8,539,486 B2 | 9/2013 | Cain et al. | |
| 8,578,033 B2 | 11/2013 | Mallart | |
| 8,850,441 B2 | 9/2014 | Allen | |
| 8,863,136 B2 | 10/2014 | Allen | |
| 8,918,791 B1* | 12/2014 | Chudgar et al. | 718/104 |
| 8,930,584 B2 | 1/2015 | Otenko et al. | |
| 2002/0143847 A1* | 10/2002 | Smith | 709/103 |
| 2002/0174136 A1 | 11/2002 | Cameron et al. | |
| 2003/0014480 A1 | 1/2003 | Pullara et al. | |
| 2003/0053469 A1* | 3/2003 | Wentink | 370/412 |
| 2003/0078958 A1 | 4/2003 | Pace et al. | |
| 2003/0110232 A1 | 6/2003 | Chen | |
| 2003/0120822 A1 | 6/2003 | Langrind et al. | |
| 2004/0177126 A1 | 9/2004 | Maine | |
| 2004/0205771 A1 | 10/2004 | Sudarshan et al. | |
| 2005/0021354 A1 | 1/2005 | Brendle et al. | |
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0262215 A1 | 11/2005 | Kirov et al. | |
| 2005/0283577 A1 | 12/2005 | Sivaram et al. | |
| 2006/0015600 A1 | 1/2006 | Piper | |
| 2006/0015700 A1 | 1/2006 | Burka | |
| 2006/0031846 A1 | 2/2006 | Jacobs et al. | |
| 2006/0143525 A1 | 6/2006 | Kilian | |
| 2006/0176884 A1 | 8/2006 | Fair | |
| 2006/0209899 A1 | 9/2006 | Cucchi et al. | |
| 2006/0230411 A1 | 10/2006 | Richter et al. | |
| 2006/0294417 A1 | 12/2006 | Awasthi et al. | |
| 2007/0118601 A1 | 5/2007 | Pacheco | |
| 2007/0156869 A1 | 7/2007 | Galchev et al. | |
| 2007/0198684 A1 | 8/2007 | Mizushima | |
| 2007/0203944 A1 | 8/2007 | Batra et al. | |
| 2007/0263650 A1 | 11/2007 | Subramania et al. | |
| 2008/0044141 A1 | 2/2008 | Willis et al. | |
| 2008/0098458 A2 | 4/2008 | Smith | |
| 2008/0140844 A1 | 6/2008 | Halpern | |
| 2008/0286741 A1 | 11/2008 | Call | |
| 2009/0034537 A1 | 2/2009 | Colrain et al. | |
| 2009/0150647 A1 | 6/2009 | Mejdrich et al. | |
| 2009/0172636 A1 | 7/2009 | Griffith | |
| 2009/0182642 A1 | 7/2009 | Sundaresan | |
| 2009/0327471 A1 | 12/2009 | Astete et al. | |
| 2010/0100889 A1 | 4/2010 | Labrie et al. | |
| 2010/0198920 A1 | 8/2010 | Wong et al. | |
| 2010/0199259 A1 | 8/2010 | Quinn | |
| 2010/0278190 A1* | 11/2010 | Yip et al. | 370/412 |
| 2011/0029812 A1 | 2/2011 | Lu et al. | |
| 2011/0055510 A1 | 3/2011 | Fritz et al. | |
| 2011/0071981 A1 | 3/2011 | Ghosh et al. | |
| 2011/0119673 A1 | 5/2011 | Bloch et al. | |
| 2011/0153992 A1 | 6/2011 | Srinivas et al. | |
| 2011/0161457 A1 | 6/2011 | Sentinelli | |
| 2011/0231702 A1 | 9/2011 | Allen et al. | |
| 2012/0023557 A1 | 1/2012 | Bevan | |
| 2012/0054472 A1 | 3/2012 | Altman et al. | |
| 2012/0066400 A1 | 3/2012 | Reynolds | |
| 2012/0066460 A1 | 3/2012 | Bihani | |
| 2012/0158684 A1 | 6/2012 | Lowenstein et al. | |
| 2012/0218891 A1 | 8/2012 | Sundararajan | |
| 2012/0239730 A1 | 9/2012 | Revanuru | |
| 2013/0004002 A1 | 1/2013 | Duchscher | |
| 2013/0132970 A1 | 5/2013 | Miyoshi | |
| 2013/0145373 A1 | 6/2013 | Noro | |
| 2013/0304848 A1* | 11/2013 | Lyle et al. | 709/217 |

OTHER PUBLICATIONS

European Patent Office, International Searching Authority, International Search Report and Written Opinion dated Mar. 6, 2014 for International Application No. PCT/US2013/067106, 11 pages.
Baldwin, Richard G., "The ByteBuffer Class in Java", Aug. 20, 2012, 14 pages. Retrieved from: <http://www.developer.com/author/Richard-G.-Baldwin-64720.htm>.

* cited by examiner

SYSTEM AND METHOD FOR USING A SEQUENCER IN A CONCURRENT PRIORITY QUEUE

CROSS REFERENCE TO RELATED APPLICATIONS

This application is related to the following patent applications, each of which is hereby incorporated by reference in its entirety:

U.S. Patent Application entitled "SYSTEM AND METHOD FOR SUPPORTING COOPERATIVE CONCURRENCY IN A MIDDLEWARE MACHINE ENVIRONMENT", application Ser. No. 13/781,475, filed Feb. 28, 2013, by inventor Oleksandr Otenko;

U.S. Patent Application entitled "SYSTEM AND METHOD FOR TRANSFORMING A QUEUE FROM NON-BLOCKING TO BLOCKING", application Ser. No. 13/781,500, filed Feb. 28, 2013, by inventor Oleksandr Otenko.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for supporting queue in a middleware machine environment.

BACKGROUND

Within any large organization, over the span of many years, the organization often finds itself with a sprawling IT infrastructure that encompasses a variety of different computer hardware, operating systems, and application software. Although each individual component of such infrastructure might itself be well-engineered and well-maintained, when attempts are made to interconnect such components, or to share common resources, it is often a difficult administrative task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for supporting a concurrent priority queue. The concurrent priority queue allows a plurality of threads to interact with the priority queue. The priority queue can use a sequencer to detect and order a plurality of threads that contend for one or more requests in the priority queue. Furthermore, the priority queue operates to reduce the contention among the plurality of threads.

Other objects and advantages of the present invention will become apparent to those skilled in the art from the following detailed description of the various embodiments, when read in light of the accompanying drawings.

DETAILED DESCRIPTION

Described herein are systems and methods that can support work sharing muxing in a cluster.

Figure 1:
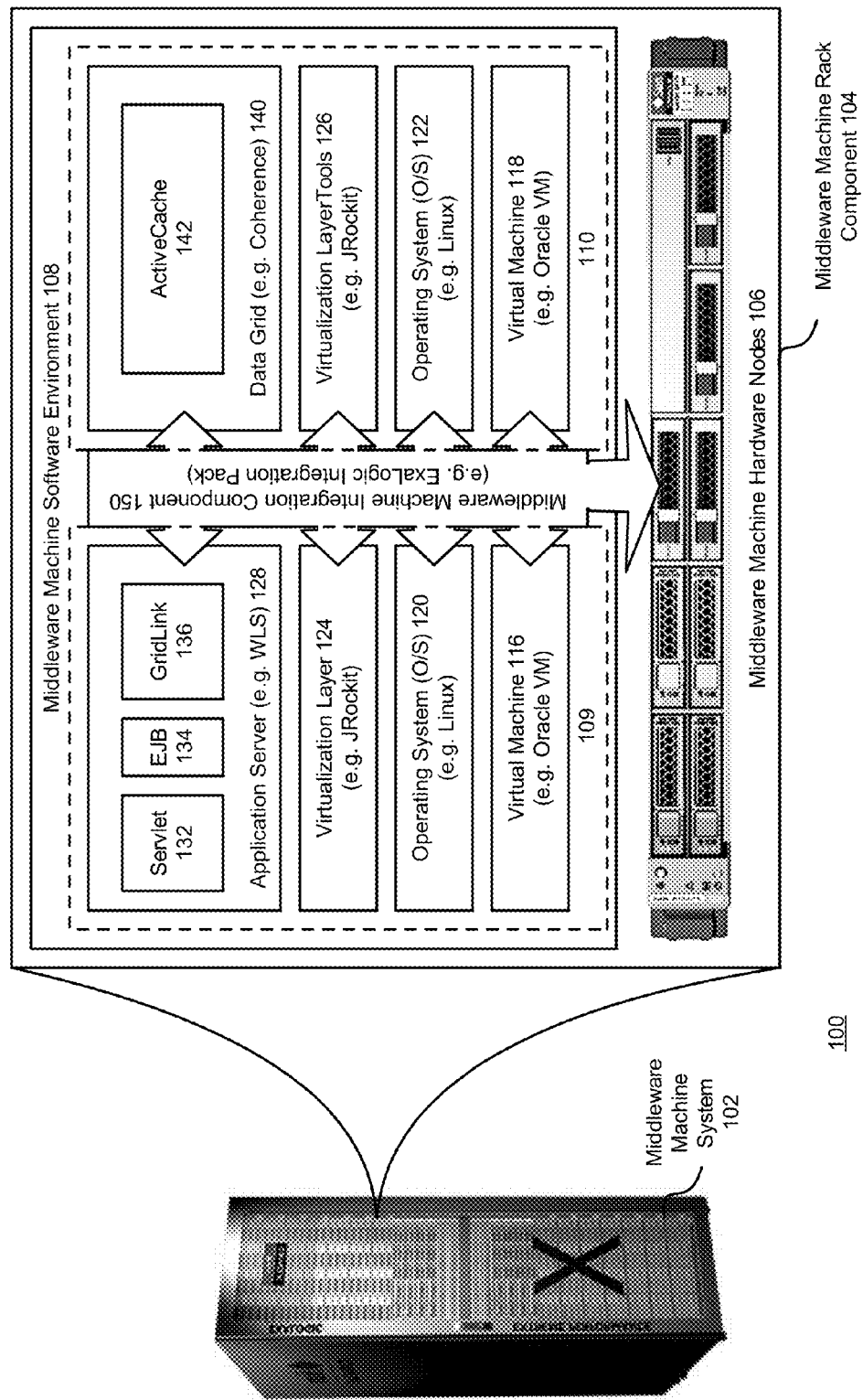
FIG. 1 shows an illustration of a middleware machine environment 100, in accordance with an embodiment of the invention.

FIG. 1 shows an illustration of a middleware machine environment 100, in accordance with an embodiment of the invention. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances. For example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers). Another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
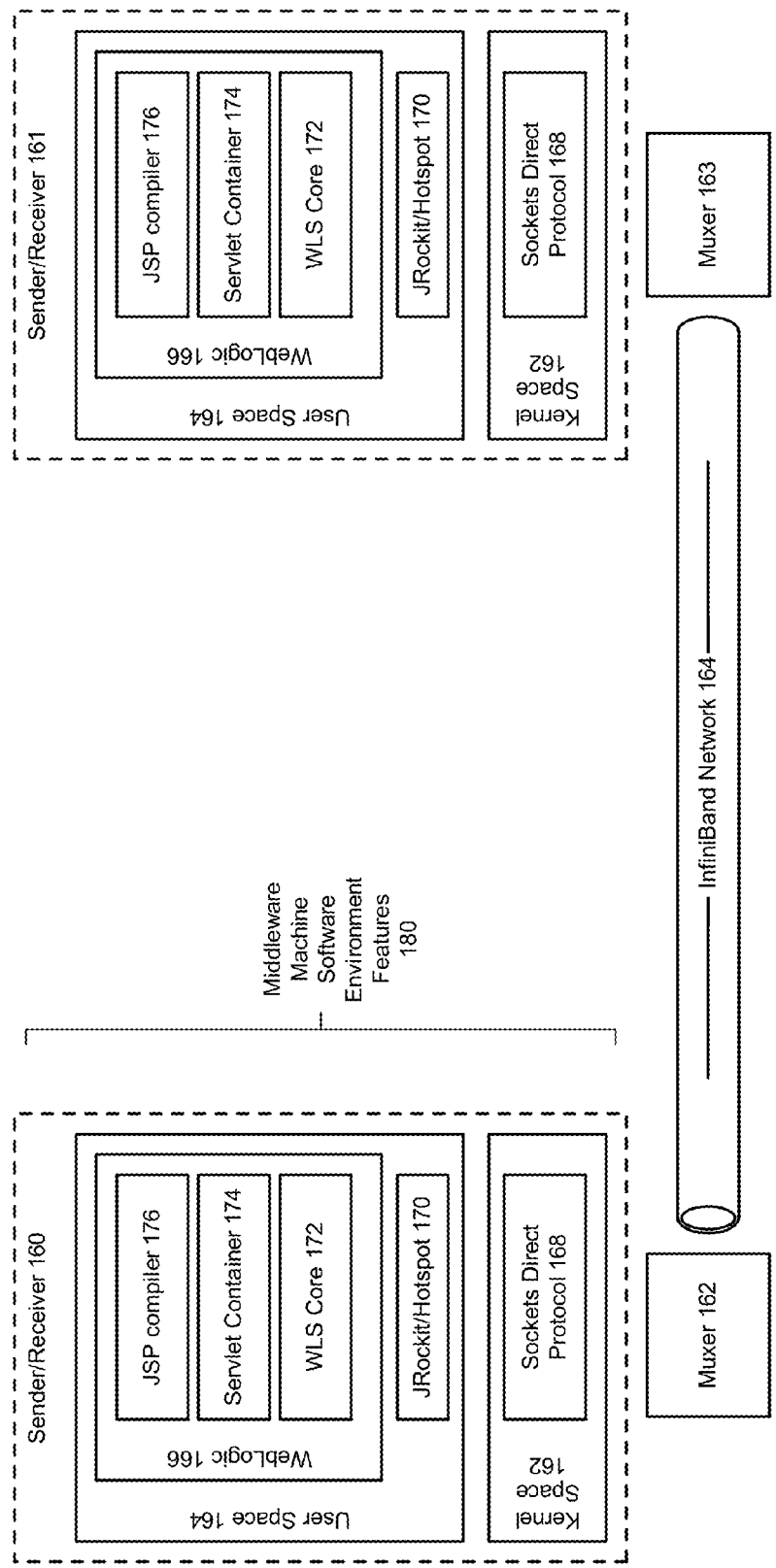
FIG. 2 shows another illustration of a middleware machine platform or environment, in accordance with an embodiment of the invention.

FIG. 2 shows another illustration of a middleware machine platform or environment, in accordance with an embodiment of the invention. As shown in FIG. 2, each application server instance can act as a sender and/or receiver 160, 161 within the middleware machine environment. Each application server instance is also associated with a muxer 162, 163, that allows the application servers to communicate with one another via an InfiniBand network 164. In the example shown in FIG. 2, an application server instance can include a kernel space 165, user space 167, and application server (e.g. WebLogic space) 166, which in turn can be associated with a sockets direct protocol 168, a JVM (e.g. JRockit/Hotspot layer) 170, a WLS core 172, a servlet container 174, and a JSP compiler 176. In accordance with other examples, other combinations of middleware-type software can be included. In accordance with various embodiments, the machine integration component can provide features 180 such as Zero Buffer Copies, Scatter/Gather I/O, T3 Connections, Lazy Deserialization, and GridLink DataSource, to provide the basis for, and improve performance within, the shared infrastructure.

Priority Queue

In accordance with various embodiments of the invention, a concurrent system can use a priority queue to prioritize incoming requests in order to provide service with an appropriate service level agreement (SLA).

Figure 3:
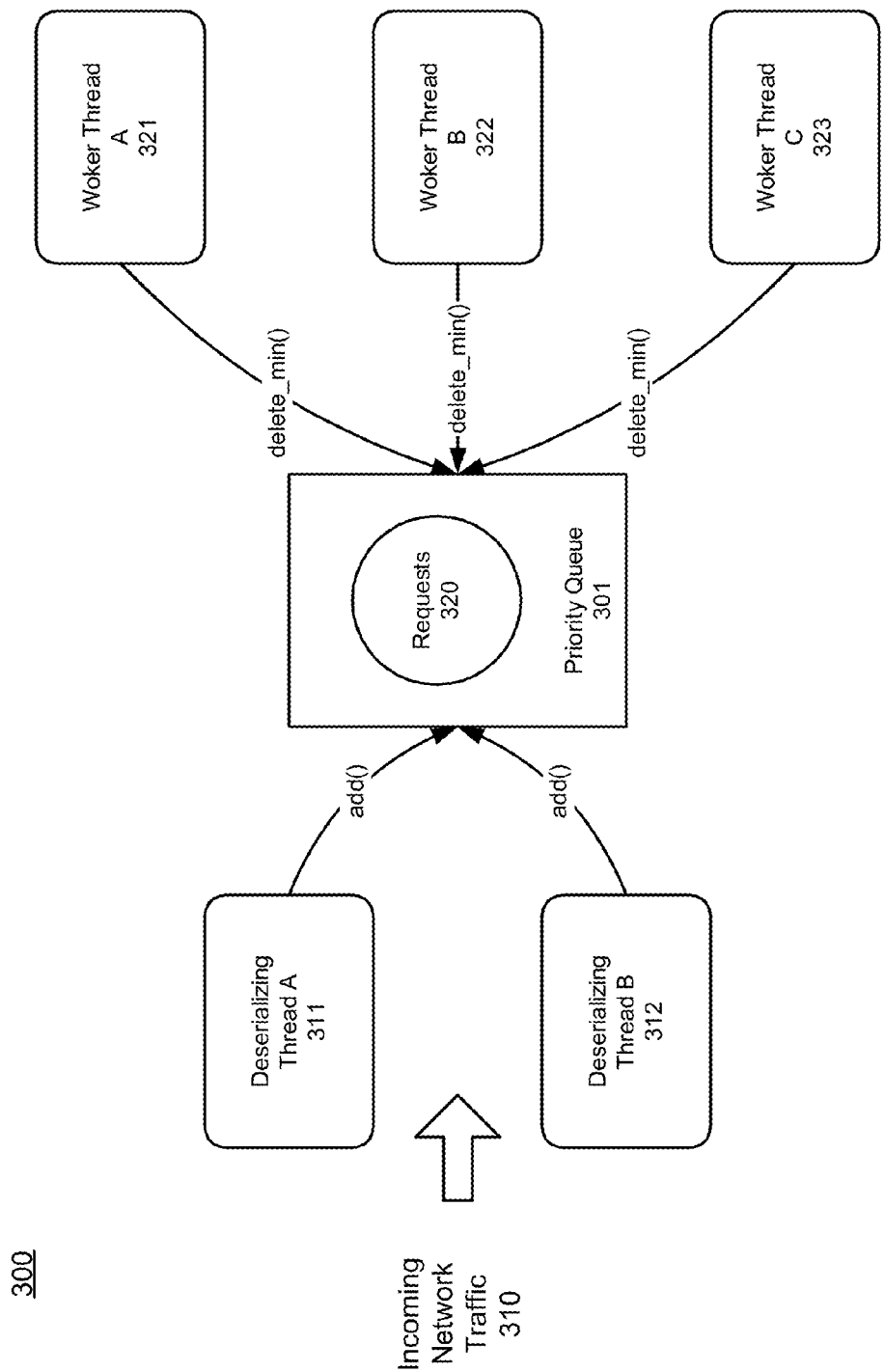
FIG. 3 shows an illustration of using a priority queue for handling requests in a middleware machine environment, in accordance with various embodiments of the invention.

FIG. 3 shows an illustration of using a priority queue for handling requests in a middleware machine environment, in accordance with various embodiments of the invention. As shown in FIG. 3, one or more threads, e.g. deserializing threads A-B 311-312, can deserialize the incoming network traffic 310 that contains one or more requests 320. The deserializing threads A-B 311-312 can place the requests 320 in a priority queue 301, e.g. using add( )methods. Then, a plurality of worker threads, e.g. worker threads A-C 321-323, can access the priority queue 301 concurrently and can claim the requests 320, e.g. using delete_min( )methods.

The priority queue 301 can be designed to meet demanding concurrency criteria, so that the interaction between the contenders does not cause degradation in the throughput of the system as a whole. Additionally, the priority queue 301 can be implemented to have a fixed memory footprint, so that the JVM is able to better optimize its operations on fixed-size arrays of primitives, and can achieve substantial cache efficiency.

In accordance with various embodiments of the invention, the priority queue 301 can be implemented based on a calendar queue, e.g. the calendar queue provided in the WebLogic Application Server. The calendar queue can include a calendar with multiple buckets, each of which can store events that fall within a particular slice of time. For example, the multiple buckets can be sorted and arranged by comparing the target service time with a current time. If the difference in time is in the first byte, then the request can be stored in a bucket in the first 256 buckets. The specific bucket can be chosen using the actual value of the target time for executing the request. Furthermore, if the difference in time is in the second byte, then the request can be stored in a bucket in the second 256 buckets.

When a consumer, e.g. via one of the worker threads A-C 321-323, tries to remove the next request that is configured to be execute the earliest, the system can scan the calendar for the first bucket that is not empty. If this bucket is not one of the first 256 buckets, then the calendar queue can use a loop and promote method to move the requests to the buckets "one level down" toward the first 256 buckets. Eventually, some requests can be promoted to one or more buckets in the first 256 buckets, and the consumer can claim a request and proceed accordingly.

The above promotion process can involve logarithmic cost, which may have an impact on the overall performance of the system. Additionally, there can be other designs for the calendar queue, the performance of which may be limited to a choice between "O(1) add, O(log N) delete_min," and "O(log N) add, O(1) delete_min."

Figure 4:
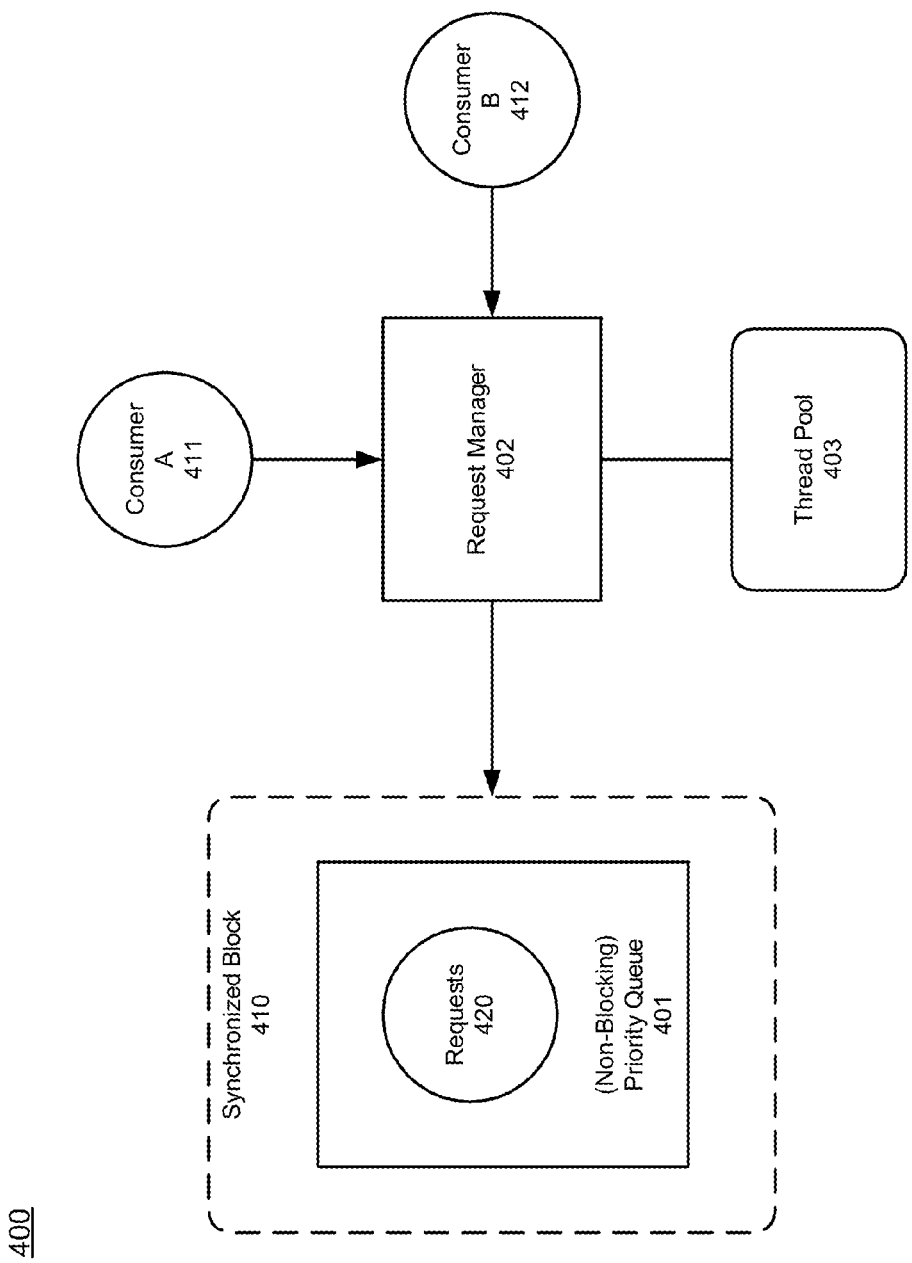
FIG. 4 shows an illustration of supporting a non-blocking queue in a middleware machine environment.

FIG. 4 shows an illustration of supporting a non-blocking queue in a middleware machine environment. As shown in FIG. 4, a plurality of consumers, e.g. consumers A-B 411-412, can concurrently access a priority queue 401 in a middleware machine environment 400. The priority queue 401 can be implemented as a non-blocking queue and can be accessed via a request manager 402.

The request manager 402, which manages a thread pool 403, can have a separate logic for associating different threads with different requests. For example, the request manager 402 can serialize all thread pool method calls by wrapping the calls to the priority queue 401 in a synchronized statement, or a synchronized block 410, using a lock mechanism.

Thus, the operations on the priority queue 401 may be limited by the single-threaded design since the serialization is done outside the non-blocking priority queue 401.

Concurrent Priority Queue

Figure 5:
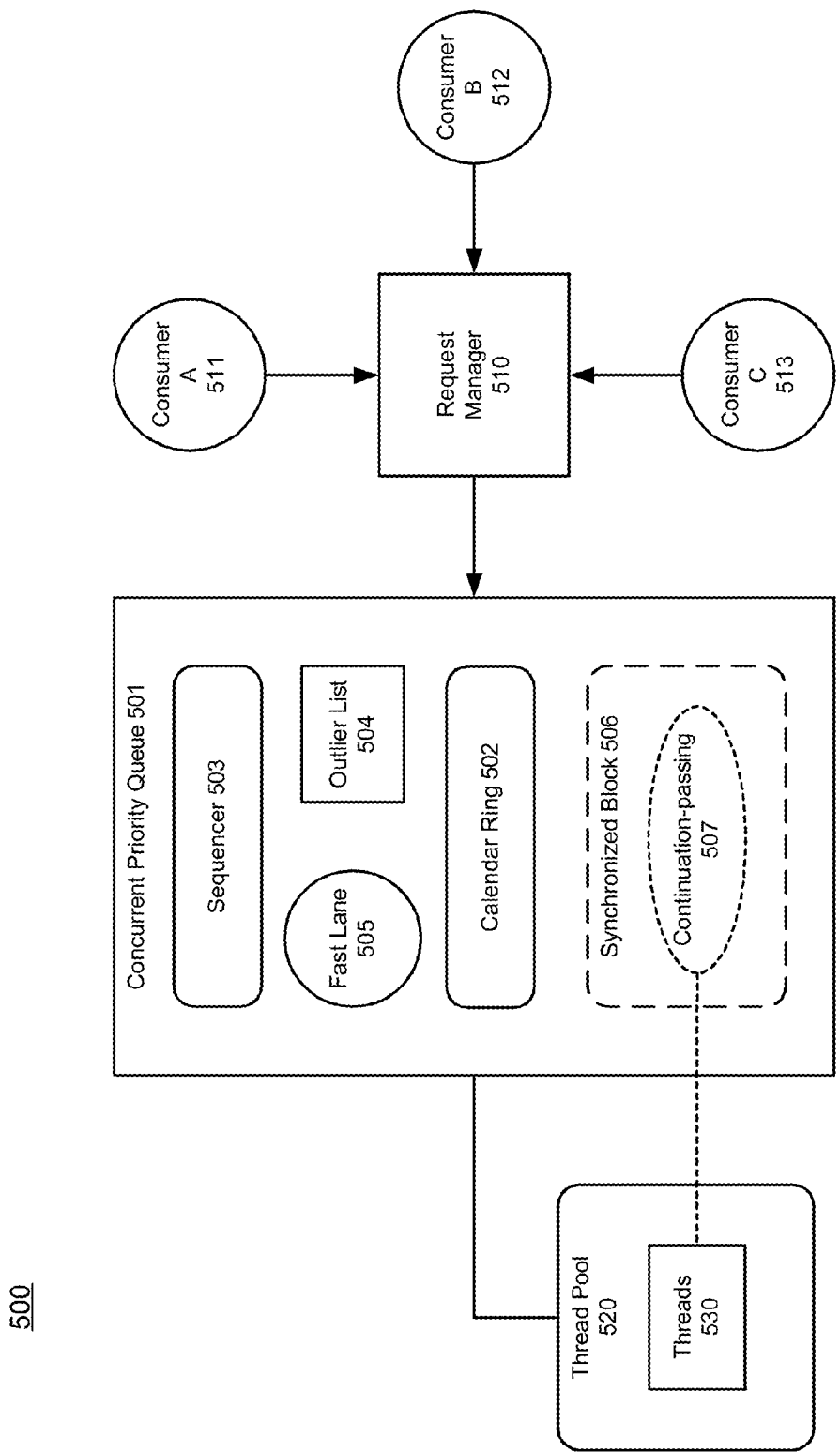
FIG. 5 shows an illustration of supporting a concurrent priority queue in accordance with various embodiments of the invention.

FIG. 5 shows an illustration of supporting a concurrent priority queue in accordance with various embodiments of the invention. As shown in FIG. 5, a plurality of consumers, e.g. consumer A-C 511-513 can concurrently access a concurrent priority queue 501 in a middleware machine environment 500.

The concurrent priority queue 501 can include a calendar, e.g. a calendar ring 502, which is capable of prioritizing and storing incoming requests. The calendar ring 502, the size of which is limited, can be configured to store requests that have a target response time within a preconfigured time limit. Within the calendar ring 502, a request can be stored, or placed, directly in the ring buffer at a position that matches Quality of Service (QoS) of the request, e.g. the target service time.

Thus, the system can achieve a much cheaper lookup for requests without changing the memory footprint of a calendar queue. Furthermore, the system can reduce the logarithmic complexity of the delete_min operation of the calendar queue to mostly a linear cache efficient search, while keeping the adding of elements to the calendar queue as O(1) operations.

Additionally, a request with a target service time higher than the preconfigured time limit can be added to a list of outliers, e.g. the outlier list 504. Since the scheduling of these requests may not be time critical, the system permits the slower addition to a sorted list of outliers 504. Furthermore, the concurrent priority queue 501 can use a sequencer, e.g. outliers_seq, to enforce a first-in-first-out (FIFO) order for the outlier list with the same QoS.

For example, the calendar ring 502 can be configured to store requests with a target response time (or QoS) below 2 seconds, since the requests with the QoS higher than 2 seconds can be considered rare. Furthermore, the requests with the QoS below 2 seconds can be placed in the calendar ring 502 that matches QoS, while the requests with the QoS higher than 2 seconds can be placed into the list of outliers 504.

Unlike the calendar queue as shown in FIG. 4, the request manager 510 does not need to put every call to the calendar queue 501 in a synchronized statement. The synchronized block 506, which supports continuation-passing 507, can be implemented within the scope of the concurrent priority queue 501. The consumers, e.g. consumers A-C 511-513, may not need to access the thread pool 520 from outside the concurrent priority queue 501.

Using continuation-passing, the system can transform the calendar queue 501 from non-blocking to blocking. The continuation-passing 507 can enable the consumers A-C 511-513 to manage the idle workers, or Threads 530, in the thread pool 520, so that the threads 530, which may be waiting in the thread pool 520, can be reused.

Additionally, the concurrent priority queue 501 can include a sequencer 503 that enables the concurrent priority queue 501 to detect contention and can use a fast lane 505 to support cooperative concurrency. Thus, the concurrent priority queue 501 can be aware of and handle the contention properly, without a need for the locks to expose knowledge about contention.

Maintain FIFO for the Outlier List

Figure 6:
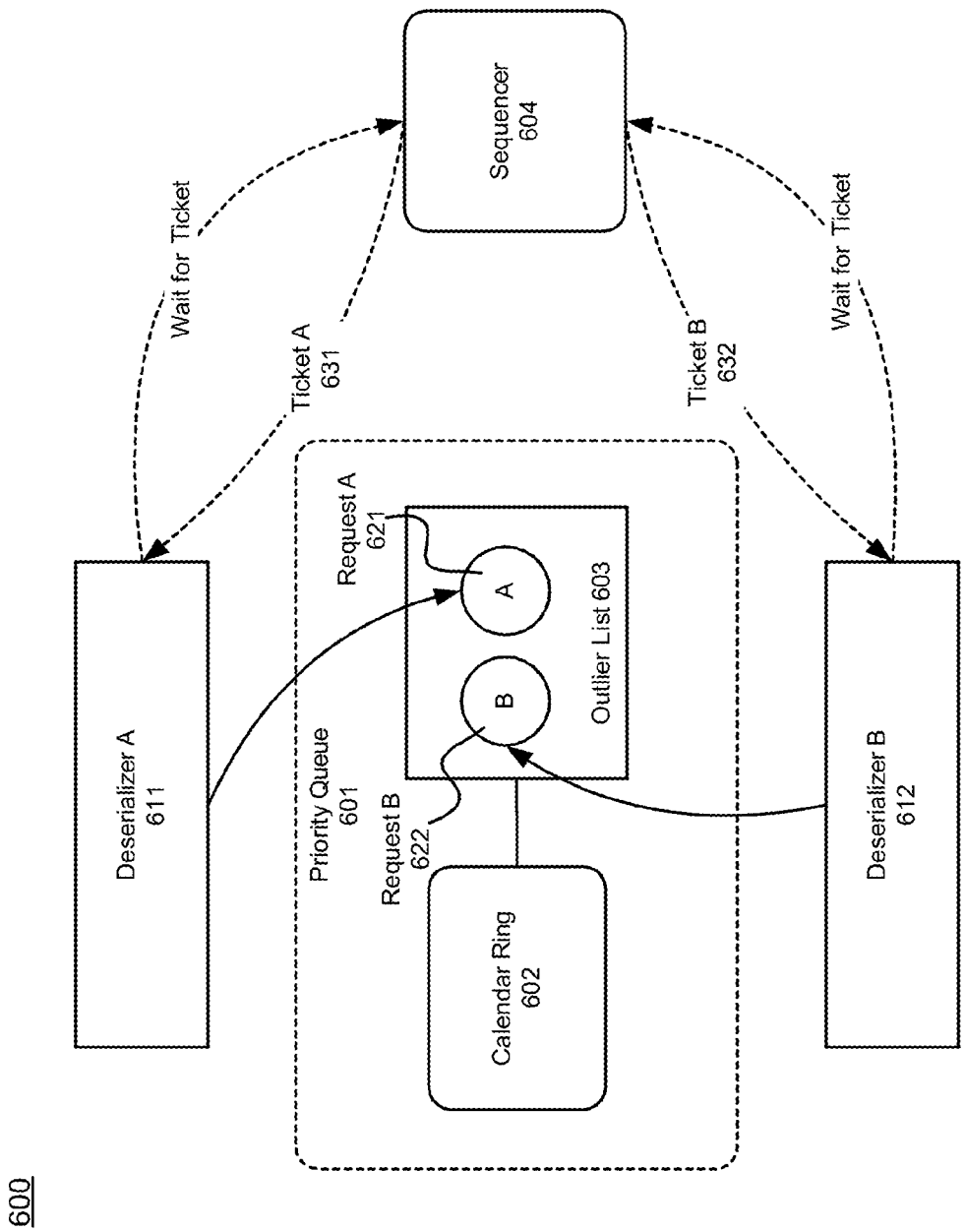
FIG. 6 shows an illustration of guaranteeing a first-in-first-out (FIFO) order for the outlier list in accordance with various embodiments of the invention.

FIG. 6 shows an illustration of guaranteeing a first-in-first-out (FIFO) order for the outlier list in accordance with various embodiments of the invention. As shown in FIG. 6, a priority queue 601 in a middleware machine environment 600 can include a calendar ring 602 and an outlier list 603.

A plurality of callers, e.g. deserializers A-B 611-612 on different threads, may try to access the priority queue 601 concurrently. The priority queue 601 can use a sequencer 604, which is based on a ticket mechanism, to guarantee the first-in-first-out (FIFO) order for the outlier list 603.

For example, before a caller, e.g. deserializer A 611, is allowed to add a request A 621 into the outlier list 603, the deserializer A 611 can first send a message to the sequencer 604 requesting a ticket. The sequencer 604 can issue a ticket, e.g. ticket A 631, to the deserializer A 611 if there is no contention.

Furthermore, another caller, e.g. deserializer B 612, may be trying to add another request, e.g. request B 622, into the outlier list 603. The sequencer 604 may receive another request for a ticket from the deserializer B 612. Since, at this time, the deserializer A 611 is adding the request A 621 into the outlier list 603, the sequencer 604 can block the deserializer B 612.

After the deserializer A 611 finishes adding the request A 621 into the outlier list 603, the deserializer A 611 can advance the sequencer 604. Then, the sequencer 604 can issue a ticket, e.g. ticket B 632, to the deserializer B 612, which allows the deserializer B 612 to add the request B 622 into the outlier list 603 after the request A 621.

Figure 7:
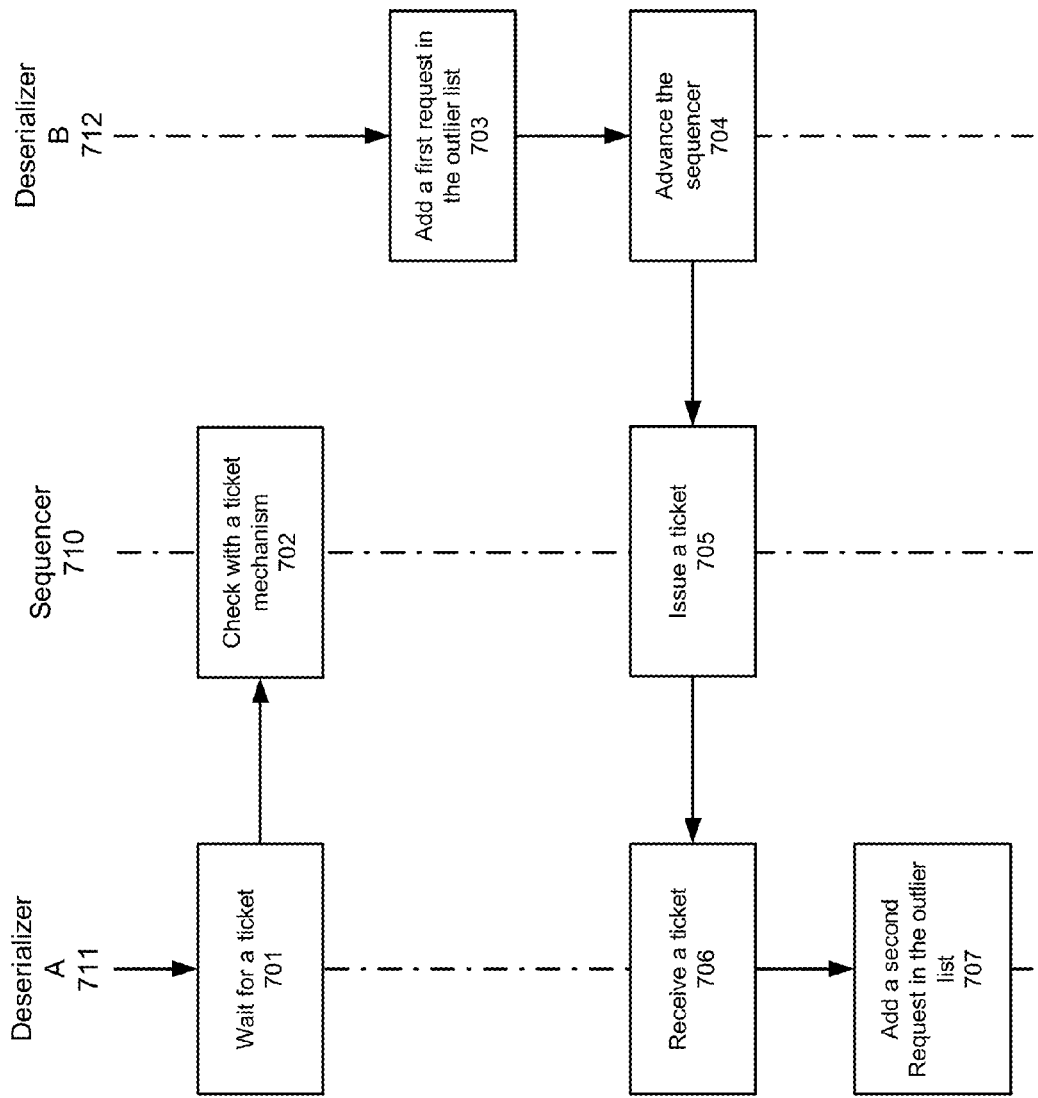
FIG. 7 illustrates an exemplary interactive chart for adding multiple requests into an outlier list in a concurrent priority queue in accordance with an embodiment of the invention.

FIG. 7 illustrates an exemplary interactive chart for adding multiple requests into an outlier list in a concurrent priority queue in accordance with an embodiment of the invention. As shown in FIG. 7, a sequencer 710 can coordinate multiple callers or threads, e.g. deserializers A-B 711-722, which may try to access a priority queue concurrently.

At step 701, the deserializer A 711 can try to obtain a ticket from the sequencer 710. Then, at step 702, the sequencer 710 can check with the ticket mechanism. If this succeeds, then there is no other caller that is trying to access the priority queue. Otherwise, the deserializer A 711 may be blocked until someone releases it.

Then, at step 703, another caller, the deserializer B 712, can successfully add a request into the outlier list, while the deserializer A 711 is blocked. At step 704, the deserializer B can try to advance the sequencer 710.

At step 705, after the sequencer 710 receives the message to advance, the sequencer 710 can create and issue a ticket to the deserializer A 711, which is waiting. Consequently, at step 706, the deserializer A 711 receives the ticket, and, at step 707, the deserializer A 711 can proceed to add another request into the outlier list.

Thus, using the sequencer 710, the FIFO order of the outlier list can be preserved without a need for implementing a synchronization or lock mechanism.

Detect and Handle Contention among Different Consumers

Figure 8:
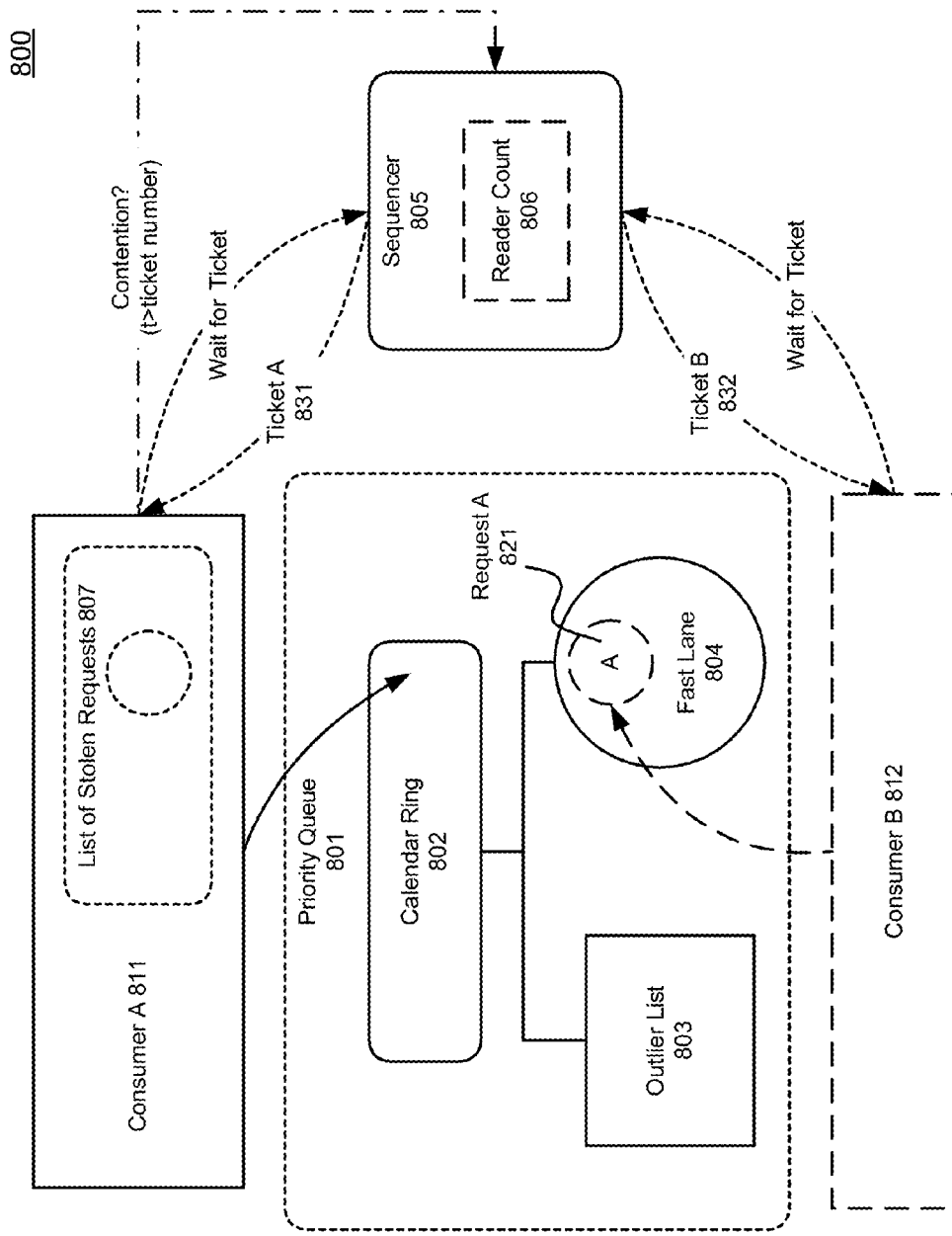
FIG. 8 shows an illustration of detecting contention among different consumers of a concurrent priority queue in accordance with various embodiments of the invention.

FIG. 8 shows an illustration of detecting contention among different consumers of a concurrent priority queue in accordance with various embodiments of the invention. As shown in FIG. 8, different consumers, e.g. consumers A-B 811-812, can concurrently access a priority queue 801 in the middleware machine environment 800. The priority queue 801 can include a calendar ring 802, an outlier list 803, and a fast lane 804.

Each consumer can take advantage of a list of stolen requests to further reduce concurrency. For example, consumer A 811 can use a list of stolen requests 807, which can appear as a local list to the consumer A 811. Additionally, each of the consumers A-B 811-812 can send a message to a sequencer 805, requesting for a ticket before it is allowed for accessing the priority queue 801.

The sequencer 805 can maintain a reader count 806, which is the current count of the total number of readers that have requested for a ticket from the sequencer 805. The sequencer 805 can increase the reader count 806 every time when it receives a ticket request. Furthermore, this reader count 806 can be used to detect contention.

For example, consumer A 811 can obtain a ticket, e.g. ticket A 831, from the sequencer 805, before it is allowed for accessing the priority queue 801. Then, another consumer B 812 can send a request for a ticket, e.g. ticket B 832, to the sequencer 805. The sequencer 805 can increase the reader count 806 and block the consumer B 812 until consumer A 811 finishes its operation.

On the other hand, consumer A 811 can detect a contention from consumer B 812, when it detects that the current reader count 806, t, at the sequencer 805 exceeds the ticket number that it holds (t>ticket number). Then, the consumer A 811 can reduce the contention by placing a request into the fast lane 804 and allowing it to be consumed by consumer B 812, which can be referred as a cooperative concurrency strategy.

Thus, using the sequencer 805, the priority queue can be optimized for handling contention among multiple consumers by allowing consumers to access the fast lane 804 and the list of stolen requests 807 in addition to the calendar ring 802, without a need for a lock or synchronization mechanism.

Figure 9:
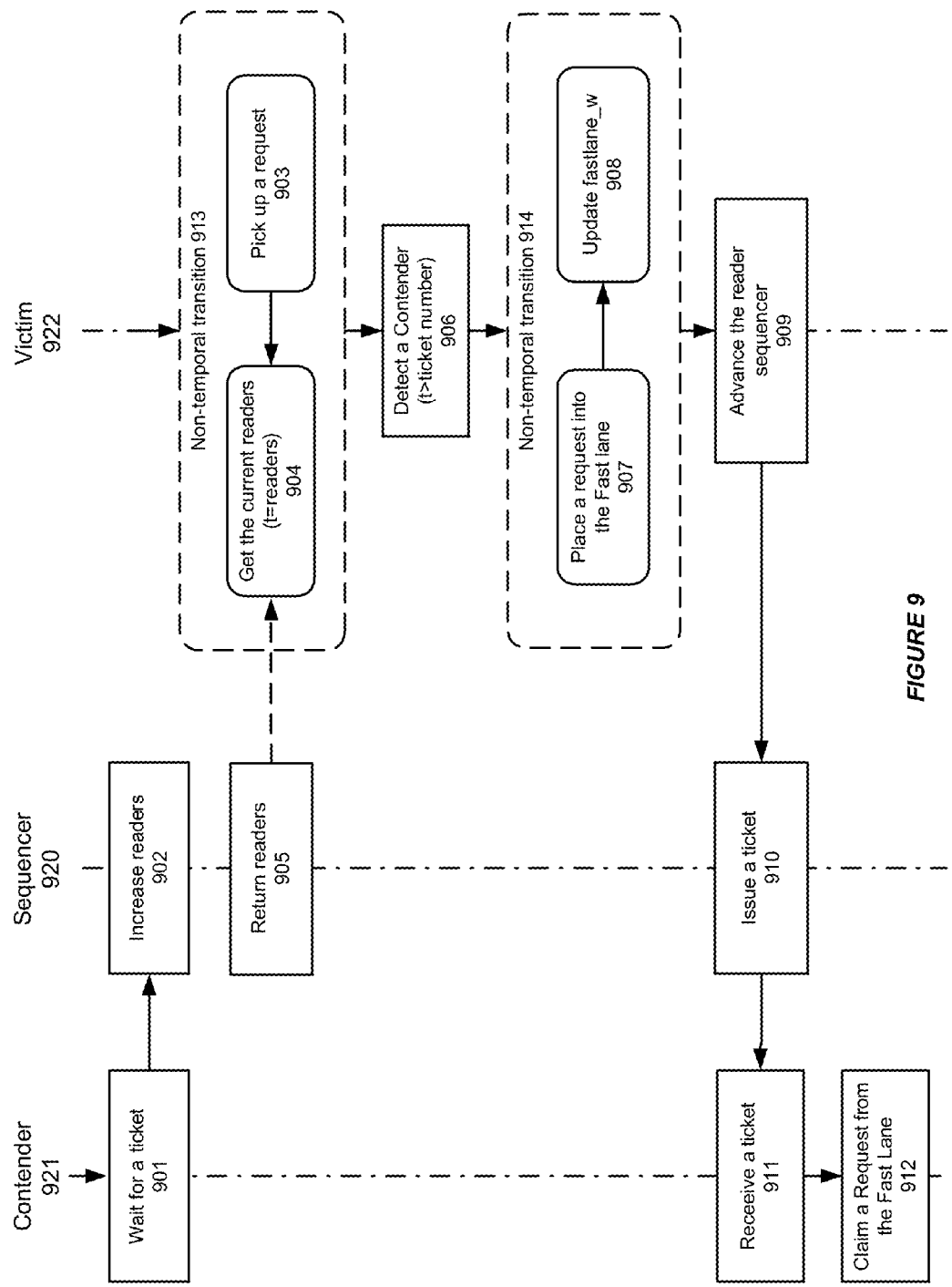
FIG. 9 is an exemplary interactive chart for illustrating interaction between a victim and a contender when a contention is detected in accordance with an embodiment of the invention.

FIG. 9 is an exemplary interactive chart for illustrating interaction between a victim and a contender when a contention is detected in accordance with an embodiment of the invention. As shown in FIG. 9, a sequencer 920 can be used to detect and handle contentions among different consumers of a concurrent priority queue, e.g. a victim 922 and a contender 921.

At step 901, the contender 921 can send a message to the sequencer 920 indicating that it is waiting for a ticket. Since the victim 922 is currently accessing the priority queue, at step 902, the sequencer 920 can block the contender 921 and increase the reader count, readers.

At steps 903-905, the victim 922 can pick up a request from the concurrent priority queue, and check with the sequencer 920 for the current readers. (The steps 903-904 can also be referred to as a non-temporal transition 913, which will be discussed in a later section.)

Then, at step 906, the victim 922 can compare the obtained reader count, t, with the ticket number, ticket number, that it holds. Since the sequencer 920 have already increased the reader count, the victim 922 can detect the contention when it finds out t>ticket number.

Subsequently, at steps 907-908, the victim 922 can place the request into the fast lane and update the request count, fastLane_w, in the fast lane, before the victim 922 tries to advance the reader sequencer, at step 909. (The steps 907-908 can also be referred to as a non-temporal transition 914, which will be discussed in a later section.)

After receiving the message from the victim 922 to advance the reader sequencer, at step 910, the sequencer 920 can proceed to issue a ticket to the contender 921, which releases the the contender 921.

Eventually, at step 911, the contender 921 can receive the ticket and, at step 912, the contender 921 can proceed to claim a request from the fast lane.

Figure 10:
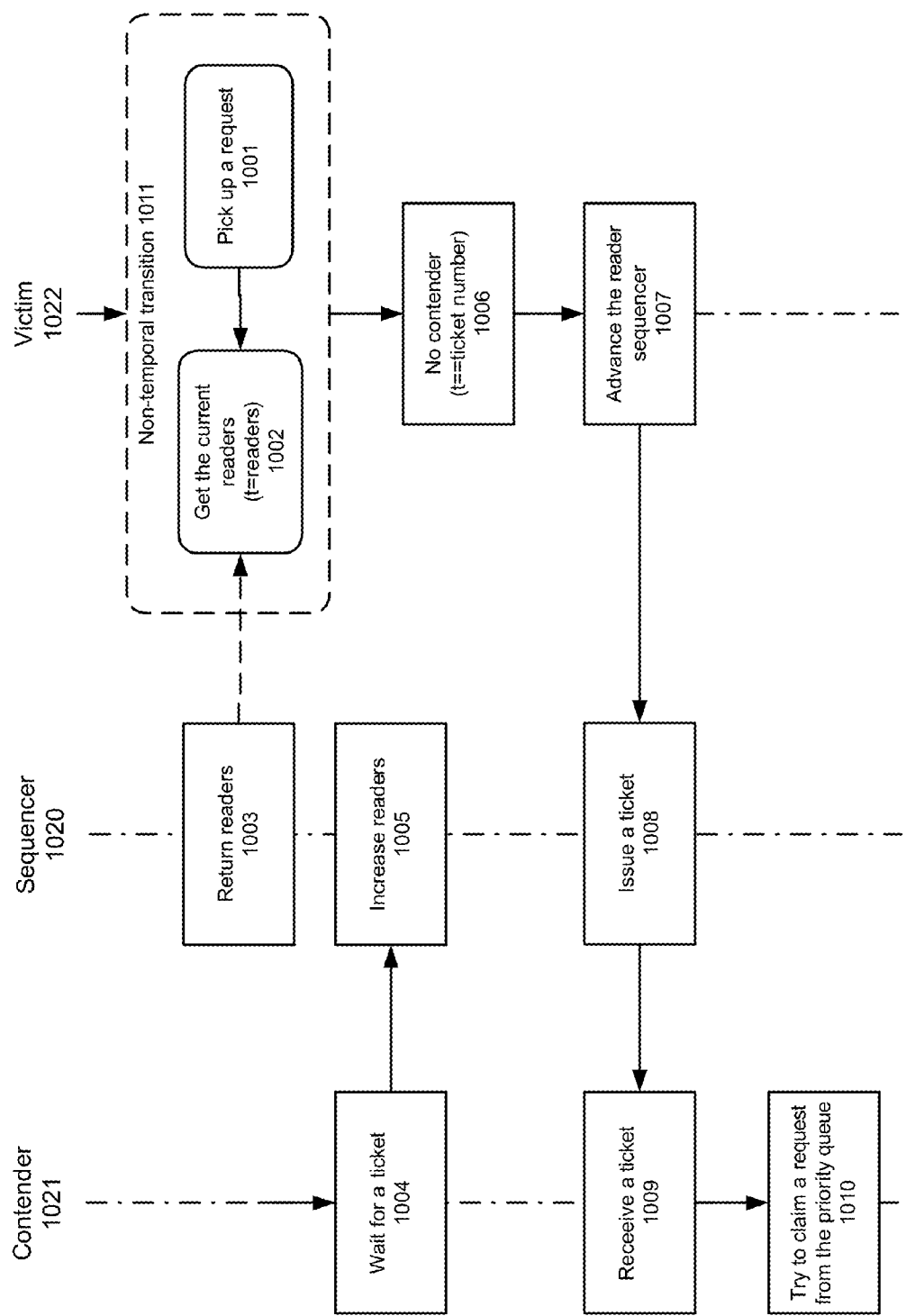
FIG. 10 is an exemplary interactive chart for illustrating interaction between a victim and a contender when no contention is detected in accordance with an embodiment of the invention.

FIG. 10 is an exemplary interactive chart for illustrating interaction between a victim and a contender when no contention is detected in accordance with an embodiment of the invention. As shown in FIG. 10, a victim 1022 may not always be able to detect contention from a contender 1021, due to the concurrent nature of accessing the priority queue.

At steps 1001-1003, the victim 1022 can pick up a request from the concurrent priority queue, and the victim 1022 can check with the sequencer 1020 for the current reader count, readers. (The steps 1001-1002 can also be referred to as a non-temporal transition 1011, which will be discussed in a later section.)

Furthermore, at step 1004, the sequencer 1020 may receive a request for a ticket from the contender 1021, and, at step 1005, the sequencer 1020 can increase the reader count, readers.

At step 1006, the victim 1022 may not be able to detect the contention from a contender 1021, since the sequencer 1020 increased the reader count after the contender 1021 returned the current readers to the victim 1022.

At step 1007, the victim 1022 can claim the request and advance the the reader sequencer, which in turn, at step 1008, can issue a ticket to the contender 1021.

Then, at step 1009, the contender 1021 can receive the ticket and, at step 1010, the contender 1021 can proceed to claim a request from the priority queue, e.g. from the fast lane.

Figure 11:
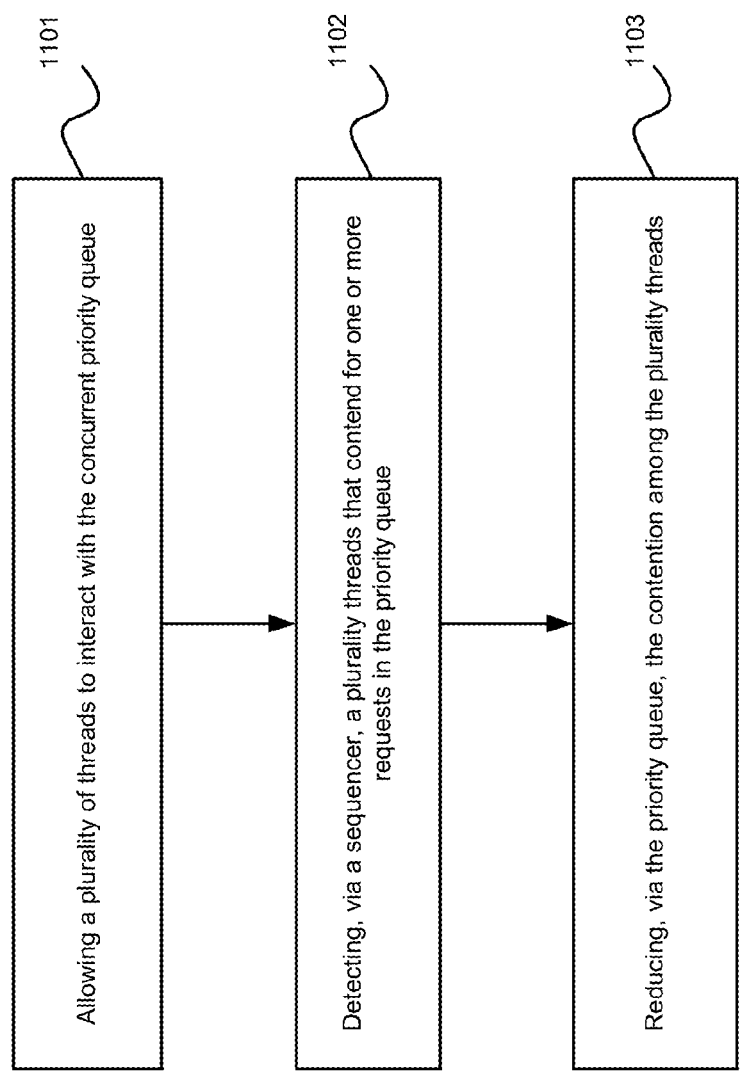
FIG. 11 illustrates an exemplary flow chart for supporting cooperative concurrency in a priority queue in accordance with an embodiment of the invention.

FIG. 11 illustrates an exemplary flow chart for supporting cooperative concurrency in a priority queue in accordance with an embodiment of the invention. As shown in FIG. 11, at step 1101, the system allows a plurality of threads to interact with the concurrent priority queue. Then, at step 1102, the system can use a sequencer to detect a plurality threads that contend for one or more requests in the priority queue. Furthermore, at step 1103, the system can reduce the contention among the plurality threads in the priority queue.

Temporal and Non-temporal Transitions

In accordance with an embodiment of the invention, a concurrent programming model can support different kinds of transitions: such as temporal transitions and non-temporal transitions.

The non-temporal transition steps, which include the usual program order steps, can be freely reordered by the compiler and processor. For example, FIG. 9 includes non-temporal transition steps 913 and 914, and FIG. 10 includes non-temporal transition step 1011. Within each of these non-temporal transition steps, it can be ensured that reordering does not break the logic intended by program order.

On the other hand, there are restrictions on reordering for the temporal transitions, which may also appear in program order. The temporal transitions can include deliberate design choices in concurrent algorithms, and the temporal transitions can be implemented as compiler and processor barriers. For example, a temporal transition in delete_min can indicate that any data loads, e.g. reading fastLane_w, cannot go ahead of data loads, e.g. the load of fastLane_r.

The use of temporal transitions and non-temporal transitions allows the caller to collect information about the progress of other parts of the concurrent algorithm in order to make consistent mutation of the states.

In the example as shown in FIG. 9, after the victim 922 detects a contender at step 906, the readers can change when more contenders arrives. Even though the victim 922 may not know the exact value of readers, it remains true that the reader count may only increases. Thus, it is safe to place the request in the fast lane ring.

On the other hand, in the example as shown in FIG. 10, after the victim 1022 determines that there is no contender (readers==ticket number) at step 1006, the true value of readers can actually be higher than what is returned previously, since the contender 1021 arrives. It can be assumed that such occurrence is rare, and the cost for determining the exact value of readers is higher than the gain from knowing it. Additionally, the cost of having a wrong guess here can be considered low, since the victim 1022 proceeds almost immediately to advance the reader sequencer at step 1007, which can unblock any contenders fairly quickly.

Furthermore, in the example as shown in FIG. 8, the adding of a request, e.g. request A 821, into the fast lane 804 by consumer A 811 can be implemented as non-temporal transitions, while the claiming of the request A 821 from the fast lane 804 by consumer B 812 can be implemented as temporal transitions.

In this example, the contender, consumer B 812, may observe the value of fastLane_w before the requests are actually stored to the fast lane ring 804. Here, only one contender is allowed to access the fast lane 804, after the victim, consumer A 811, advances the readers sequencer. It follows that there can be no more contenders accessing the fast lane 804 than the number of requests that can be observed.

Thus, even though the contenders 811 may observe that the request count for the fast lane 804, fastLane_w, is ahead of the actual filled part of the fast lane 804, the contenders can only access the values using an index, fastLane_r, which is updated only once by each contender. In other words, the victim, consumer A 811, can control the accessibility of requests in fast lane 804 by controlling the maximum number of contenders that may be released, since the value of fastLane_r can reach fastLane_w, only when enough contenders are released by the victim 812.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   one or more microprocessors;
   a priority queue for prioritizing a plurality of requests received from a plurality of consumers;
   wherein the priority queue comprises a synchronized block having a continuation passing function and manages a plurality of threads for non-blocking receiving of said plurality of requests from said plurality of consumers;
   wherein the priority queue comprises a calendar ring buffer comprising a calendar ring buffer memory which operates to store a first subset of said plurality of requests having a target response time less than a pre-configured time;
   wherein the priority queue comprises an outlier list comprising an outlier list memory which operates to store a second subset of said plurality of requests having a target response time greater than the pre-configured time;
   wherein the priority queue comprises a sequencer which operates to enforce a first-in-first-out order for said second subset of said plurality of requests stored in the outlier list; and
   wherein the priority queue operates to reduce the contention among the plurality of consumers and the plurality of requests.

2. The system according to claim 1, wherein:
   each of said first subset of said plurality of requests is stored in the calendar ring buffer at a position dependent upon a value of a QoS associated with each of said first subset of said plurality of requests.

3. The system according to claim 1, wherein:
   the pre-configured time is specified to be two seconds.

4. The system according to claim 1, wherein:
   the sequencer implements a ticket mechanism to enforce a first-in-first-out order for said second subset of said plurality of requests stored in the outlier list without requiring a synchronization mechanism or a lock mechanism.

5. The system according to claim 1, wherein:
   the priority queue contains a list of stolen requests that can be used to reduce contention on the calendar ring when workload is intensive, wherein the list of stolen requests contains one or more requests that land on a same calendar entry.

6. The system according to claim 1, wherein:
   the priority queue contains a fast lane that can be used to support cooperative concurrency.

7. The system according to claim 1, wherein:
   the sequencer uses a ticket mechanism to enforce a first-in-first-out order for said second subset of said plurality of requests stored in the outlier list.

8. The system according to claim 7, wherein:
   the ticket mechanism keeps a reader count that is increased every time a consumer tries to access the priority queue.

9. The system according to claim 7, wherein:
   the sequencer operates to issue a ticket to a consumer of said plurality of consumers, wherein the ticket allows the consumer to access the priority queue.

10. The system according to claim 7, wherein:
    the ticket mechanism keeps a reader count that is increased when a consumer of said plurality of consumers tries to access the priority queue; and
    wherein said reader count is used to detect contention between said plurality of consumers and said plurality of requests.

11. A method for prioritizing a plurality of requests received from a plurality of consumers in a middleware machine environment, the method comprising;
    receiving said plurality of requests from said plurality of consumers using a synchronization block having a continuation passing function which manages a plurality of threads for non-blocking receiving of said plurality of requests from said plurality of consumers;
    storing a first subset of said plurality of requests having a target response time less than a pre-configured time in a calendar ring buffer;
    storing a second subset of said plurality of requests having a target response time greater than the pre-configured time in an outlier list;
    enforcing a first-in-first-out order for said second subset of said plurality of requests stored in the outlier list using a sequencer; and
    reducing contention among said plurality of consumers and said plurality of requests.

12. The method of claim 11, further comprising:
    storing each of said first subset of said plurality of requests in the calendar ring buffer at a position dependent upon a value of a QoS associated with said each of said first subset of said plurality of requests.

13. The method of claim 11, wherein the pre-configured time is specified to be two seconds.

14. The method of claim 11, further comprising:
    implementing a ticket mechanism in said sequencer to enforce said first-in-first-out order for said second subset of said plurality of requests stored in the outlier list without requiring a synchronization mechanism or a lock mechanism.

15. The method of claim 11, further comprising:
    storing a list of stolen requests that can be used to reduce contention on the calendar ring when workload is intensive, wherein the list of stolen requests contains one or more requests that land on a same calendar entry.

16. The method of claim 11, further comprising:
    providing a fast lane which supports cooperative concurrency.

17. The method of claim 11, further comprising:
    implementing a ticket mechanism in said sequencer to enforce a first-in-first-out order for said second subset of said plurality of requests stored in the outlier list; and maintaining with said ticket mechanism a reader count that is increased every time a consumer tries to access the priority queue.

18. The method of claim 11, further comprising:
implementing a ticket mechanism in said sequencer to enforce a first-in-first-out order for said second subset of said plurality of requests stored in the outlier list; and
issuing a ticket to a consumer of said plurality of consumers, wherein the ticket allows the consumer to access said outlier list.

19. The method of claim 11, further comprising:
implementing a ticket mechanism in said sequencer to enforce a first-in-first-out order for said second subset of said plurality of requests stored in the outlier list;
maintaining with said ticket mechanism a reader count that is increased every time a consumer tries to access the priority queue; and
used said reader count to detect contention between said plurality of consumers and said plurality of requests.

20. A non-transitory computer readable medium including instructions stored thereon for prioritizing a plurality of requests received from a plurality of consumers in a middleware machine environment, which instructions, when executed by a computer, cause the computer to perform steps comprising:
receiving said plurality of requests from said plurality of consumers using a synchronization block having a continuation passing function which manages a plurality of threads for non-blocking receiving of said plurality of requests from said plurality of consumers;
storing a first subset of said plurality of requests having a target response time less than a pre-configured time in a calendar ring buffer;
storing a second subset of said plurality of requests having a target response time greater than the pre-configured time in an outlier list;
enforcing a first-in-first-out order for said second subset of said plurality of requests stored in the outlier list using a sequencer; and
reducing contention among said plurality of consumers and said plurality of requests.

* * * * *

UNITED STATES PATENT AND TRADEMARK OFFICE
CERTIFICATE OF CORRECTION

PATENT NO. : 9,110,715 B2  
APPLICATION NO. : 13/781493  
DATED : August 18, 2015  
INVENTOR(S) : Otenko Page 1 of 1

It is certified that error appears in the above-identified patent and that said Letters Patent is hereby corrected as shown below:

Drawings

On sheet 3 of 11, in FIG. 3, under reference numeral 321, line 1, delete "Woker" and insert -- Worker --, therefor.

On sheet 3 of 11, in FIG. 3, under reference numeral 322, line 1, delete "Woker" and insert -- Worker --, therefor.

On sheet 3 of 11, in FIG. 3, under reference numeral 323, line 1, delete "Woker" and insert -- Worker --, therefor.

On sheet 9 of 11, in FIG. 9, under reference numeral 911, line 1, delete "Receeive" and insert -- Receive --, therefor.

On sheet 10 of 11, in FIG. 10, under reference numeral 1009, line 1, delete "Receeive" and insert -- Receive --, therefor.

On sheet 11 of 11, in FIG. 11, under reference numeral 1103, line 1, after "plurality" insert -- of --.

Specification

In column 7, line 22, after "releases" delete "the the" and insert -- the --, therefor.

In column 7, line 47, after "advance" delete "the the" and insert -- the --, therefor.

In column 7, line 57, after "plurality" insert -- of --.

In column 7, line 60, after "plurality" insert -- of --.

Signed and Sealed this  
Twenty-first Day of June, 2016

Michelle K. Lee  
*Director of the United States Patent and Trademark Office*